United States Patent
Sun et al.

(10) Patent No.: US 9,811,718 B2
(45) Date of Patent: Nov. 7, 2017

(54) METHOD AND A SYSTEM FOR FACE VERIFICATION

(71) Applicant: BEIJING SENSETIME TECHNOLOGY DEVELOPMENT CO., LTD., Beijing (CN)

(72) Inventors: Yi Sun, Hong Kong (CN); Xiaogang Wang, Hong Kong (CN); Xiaoou Tang, Hong Kong (CN)

(73) Assignee: Beijing Sensetime Technology Development CO., LTD, Haidian District, Beijing (CN)

( * ) Notice: Subject to any disclaimer, the term of this patent is extended or adjusted under 35 U.S.C. 154(b) by 0 days.

(21) Appl. No.: 15/129,567

(22) PCT Filed: Apr. 11, 2014

(86) PCT No.: PCT/CN2014/000390
§ 371 (c)(1),
(2) Date: Sep. 27, 2016

(87) PCT Pub. No.: WO2015/154206
PCT Pub. Date: Oct. 15, 2015

(65) Prior Publication Data
US 2017/0147868 A1    May 25, 2017

(51) Int. Cl.
*G06K 9/00* (2006.01)
*G06K 9/52* (2006.01)
(Continued)

(52) U.S. Cl.
CPC ..... *G06K 9/00281* (2013.01); *G06K 9/00288* (2013.01); *G06K 9/52* (2013.01);
(Continued)

(58) Field of Classification Search
CPC .. G06K 9/00281; G06K 9/00288; G06K 9/52; G06K 9/6215; G06K 9/6269; G06K 2009/4666; G06N 3/08
See application file for complete search history.

(56) References Cited

U.S. PATENT DOCUMENTS

| | | | | |
|---|---|---|---|---|
| 8,553,984 B2 * | 10/2013 | Slotine | ................. | G06K 9/4671 382/103 |
| 8,700,552 B2 * | 4/2014 | Yu | ............................ | G06N 3/08 706/25 |

(Continued)

FOREIGN PATENT DOCUMENTS

CN    103605972 A    2/2014

OTHER PUBLICATIONS

Farabet, Clement, et al. "Learning hierarchical features for scene labeling." IEEE transactions on pattern analysis and machine intelligence 35.8 (2013): 1915-1929.*
Sun, Yi, Xiaogang Wang, and Xiaoou Tang. "Hybrid deep learning for face verification." Proceedings of the IEEE International Conference on Computer Vision. 2013.*
(Continued)

*Primary Examiner* — Jonathan S Lee
(74) *Attorney, Agent, or Firm* — Reising Ethington P.C.

(57) ABSTRACT

Disclosed are a method and an apparatus for face verification. The apparatus comprises a feature extracting unit configured to extract HIFs (Hidden Identity Features) for different regions of faces by using differently trained ConvNets, wherein last hidden layer neuron activations of said ConvNets are considered as the HIFs. The apparatus further comprises a verification unit configured to concatenate the extracted HIFs of each of the faces to form a feature vector, and then compare two of the formed feature vectors to determine if they are from the same identity or not.

13 Claims, 5 Drawing Sheets

(51) Int. Cl.
G06K 9/62 (2006.01)
G06N 3/08 (2006.01)
G06K 9/46 (2006.01)
(52) U.S. Cl.
CPC ......... *G06K 9/6215* (2013.01); *G06K 9/6269* (2013.01); *G06N 3/08* (2013.01); *G06K 2009/4666* (2013.01)

(56) References Cited

U.S. PATENT DOCUMENTS

| | | | |
|---|---|---|---|
| 9,129,148 B1* | 9/2015 | Li | G06K 9/00268 |
| 2011/0150301 A1 | 6/2011 | Song et al. | |
| 2013/0124438 A1 | 5/2013 | Lee et al. | |
| 2016/0048741 A1* | 2/2016 | Nguyen | G06K 9/6256 382/159 |
| 2016/0148079 A1* | 5/2016 | Shen | G06K 9/4628 382/157 |
| 2016/0307027 A1* | 10/2016 | Liang | G06K 9/00255 |
| 2017/0061250 A1* | 3/2017 | Gao | G06K 9/6267 |

OTHER PUBLICATIONS

Sun, Yi, Xiaogang Wang, and Xiaoou Tang. "Deep convolutional network cascade for facial point detection." Proceedings of the IEEE conference on computer vision and pattern recognition. 2013.*

Rukkanchanunt, Thapanapong, and Tom Paine. "Deep Learning for Face Verification."*

Krizhevsky, Alex, Ilya Sutskever, and Geoffrey E. Hinton. "Imagenet classification with deep convolutional neural networks." Advances in neural information processing systems. 2012.*

Huang, Gary B., Honglak Lee, and Erik Learned-Miller. "Learning hierarchical representations for face verification with convolutional deep belief networks." Computer Vision and Pattern Recognition (CVPR), 2012 IEEE Conference on. IEEE, 2012.*

Cheung, Brian. "Convolutional neural networks applied to human face classification." Machine Learning and Applications (ICMLA), 2012 11th International Conference on. vol. 2. IEEE, 2012.*

International Search Report for International application No. PCT/CN2014/000390, dated Jan. 28, 2015, 3 pages.

* cited by examiner

METHOD AND A SYSTEM FOR FACE VERIFICATION

TECHNICAL FIELD

The present application relates to a method for face verification and a system thereof.

BACKGROUND

Many face verification methods represent faces by high-dimensional over-complete face descriptors like LBP or SIFT, followed by shallow face verification models.

Some previous studies have further learned identity related features based on low-level features. In these processes, attribute and simile classifiers are trained to detect facial attributes and measure face similarities to a set of reference people, or distinguish the faces from two different people. Features are outputs of the learned classifiers. However, they used SVM (Support Vector Machine) classifiers, which are shallow structures, and their learned features are still relatively low-level.

A few deep models have been used for face verification Chopra et al. used a Siamese architecture, which extracts features separately from two compared inputs with two identical sub-networks, taking the distance between the outputs of the two sub-networks as dissimilarity. Their feature extraction and recognition are jointly learned with the face verification target.

Although in the prior art, some of solutions used multiple deep ConvNets to learn high-level face similarity features and trained classifiers for face verification, their features are jointly extracted from a pair of faces instead of from a single face. Though highly discriminative, the face similarity features are too short and some useful information may have been lost before the final verification.

Some previous studies have also used the last hidden layer features of ConvNets for other tasks. Krizhevsky et al. illustrated that the last hidden layer of ConvNets, when learned with the target of image classification, approximates Euclidean distances in the semantic space, but with no quantitative results to show how well these features are for image retrieval. Farabet et al. concatenated the last hidden layer features extracted from scale-invariant ConvNets with multiple scales of inputs for scene labeling. Previous methods have not tackled the face verification problem. Also, it is unclear how to learn features that are sufficiently discriminative for the fine-grained classes of face identities.

SUMMARY

In one aspect of the present application, disclosed is an apparatus for face verification, comprising:

a feature extracting unit configured to extract HIFs for different regions of faces by using different trained ConvNets, wherein last hidden layer neuron activations of said ConvNets are considered as the HIFs; and a verification unit configured to concatenate the extracted HIFs of each of the faces to form a feature vector; and then compare two of the formed feature vectors to determine if they are from the same identity or not.

In another aspect of the present application, disclosed is method for face verification, comprising:

extracting HIFs from different regions of faces by using different trained ConvNets, wherein last hidden layer neuron activations of said ConvNets are considered as the HIFs;

concatenating the extracted HIFs to form a feature vector; and comparing two of the formed feature vectors to determine if they are from the same identity or not.

According to the present application, the apparatus may further comprise a training unit configured to train the ConvNets for identity classification by inputting aligned regions of faces.

In contrast to the existing methods, the present application classifies all the identities from the training set simultaneously. Moreover, the present application utilizes the last hidden layer activations as features instead of the classifier outputs. In our ConvNets, the neuron number of the last hidden layer is much smaller than that of the output, which forces the last hidden layer to learn shared hidden representations for faces of different people in order to well classify all of them, resulting in highly discriminative and compact features.

The present application may conduct feature extraction and recognition in two steps, in which the first feature extraction step learned with the target of face classification, which is a much stronger supervision signal than verification.

The present application uses High-dimensional high-level features for face verification. The HIFs extracted from different face regions are complementary. In particular, the feature is extracted from the last hidden layer of the deep ConvNets, which are global, highly-nonlinear, and revealing the face identities. In addition, different ConvNets learn from different visual cues (face regions). So they have to use different ways to judge the face identities and thus the HIFs are complementary.

BRIEF DESCRIPTION OF THE DRAWING

Exemplary non-limiting embodiments of the present invention are described below with reference to the attached drawings. The drawings are illustrative and generally not to an exact scale. The same or similar elements on different figures are referenced with the same reference numbers.

DETAILED DESCRIPTION

Figure 1:
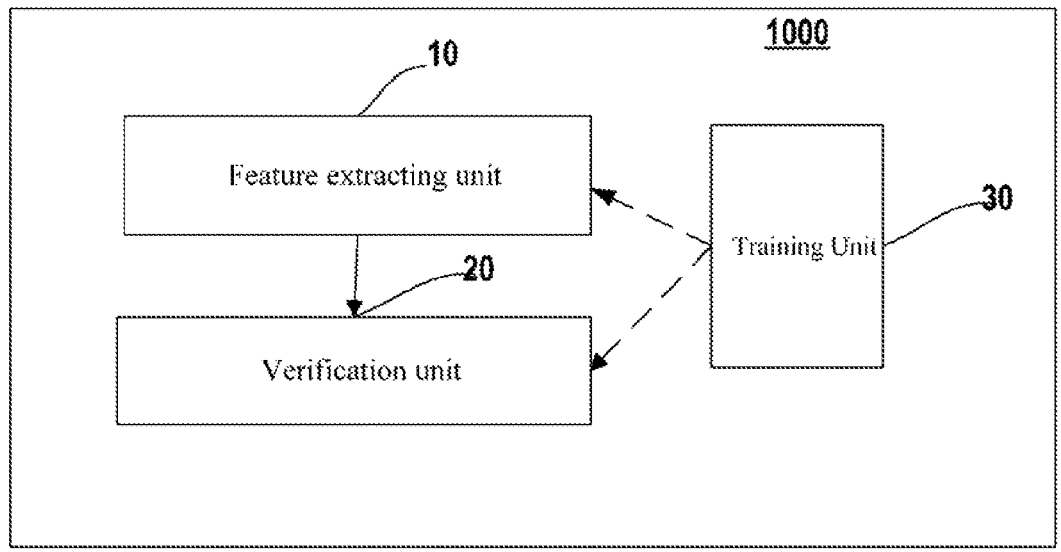
FIG. 1 is a schematic diagram illustrating an apparatus for face verification consistent with some disclosed embodiments.

Reference will now be made in detail to exemplary embodiments, examples of which are illustrated in the accompanying drawings. When appropriate, the same reference numbers are used throughout the drawings to refer to the same or like parts. FIG. 1 is a schematic diagram illustrating an exemplary apparatus 1000 for face verification consistent with some disclosed embodiments.

It shall be appreciated that the apparatus 1000 may be implemented using certain hardware, software, or a combination thereof. In addition, the embodiments of the present invention may be adapted to a computer program product embodied on one or more computer readable storage media (comprising but not limited to disk storage, CD-ROM, optical memory and the like) containing computer program codes.

Figure 2:
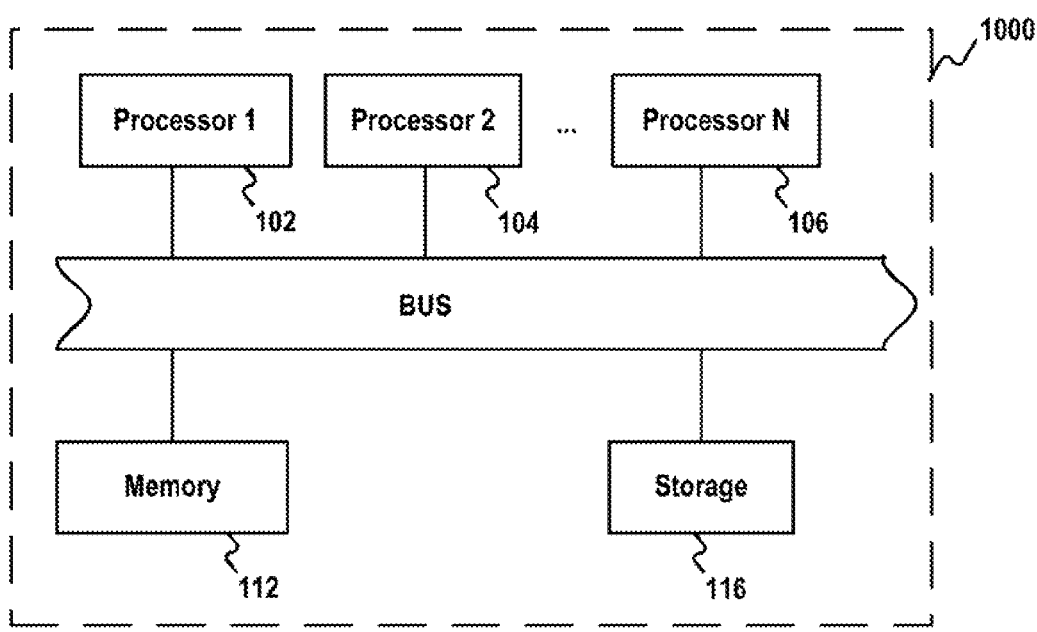
FIG. 2 is a schematic diagram illustrating an apparatus for face verification when it is implemented in software, consistent with some disclosed embodiments.

In the case that the apparatus 1000 is implemented with software, the apparatus 1000 may include a general purpose computer, a computer cluster, a mainstream computer, a computing device dedicated for providing online contents, or a computer network comprising a group of computers operating in a centralized or distributed fashion. As shown in FIG. 2, apparatus 1000 may include one or more processors (processors 102, 104, 106 etc.), a memory 112, a storage device 116, a communication interface 114, and a bus to facilitate information exchange among various components of apparatus 1000. Processors 102-106 may include a central processing unit ("CPU"), a graphic processing unit ("GPU"), or other suitable information processing devices. Depending on the type of hardware being used, processors 102-106 can include one or more printed circuit boards, and/or one or more microprocessor chips. Processors 102-106 can execute sequences of computer program instructions to perform various methods that will be explained in greater detail below.

Memory 112 can include, among other things, a random access memory ("RAM") and a read-only memory ("ROM"). Computer program instructions can be stored, accessed, and read from memory 112 for execution by one or more of processors 102-106. For example, memory 112 may store one or more software applications. Further, memory 112 may store an entire software application or only a part of a software application that is executable by one or more of processors 102-106. It is noted that although only one block is shown in FIG. 1, memory 12 may include multiple physical devices installed on a central computing device or on different computing devices.

Referring FIG. 1 again, where the apparatus 1000 is implemented by the hardware, it may comprise a feature extracting unit 10 and a verification unit 20. The feature extracting unit 10 is configured to extract HIFs (Hidden Identity Features) for different regions of faces by using different trained ConvNets, wherein last hidden layer neuron activations of said ConvNets are considered as the HIFs, and the verification unit 20 configured to concatenate the extracted HIFs to form a feature vector; and then compare two of the formed vectors to determine if the two vectors are from the same identity or not.

Figure 3:
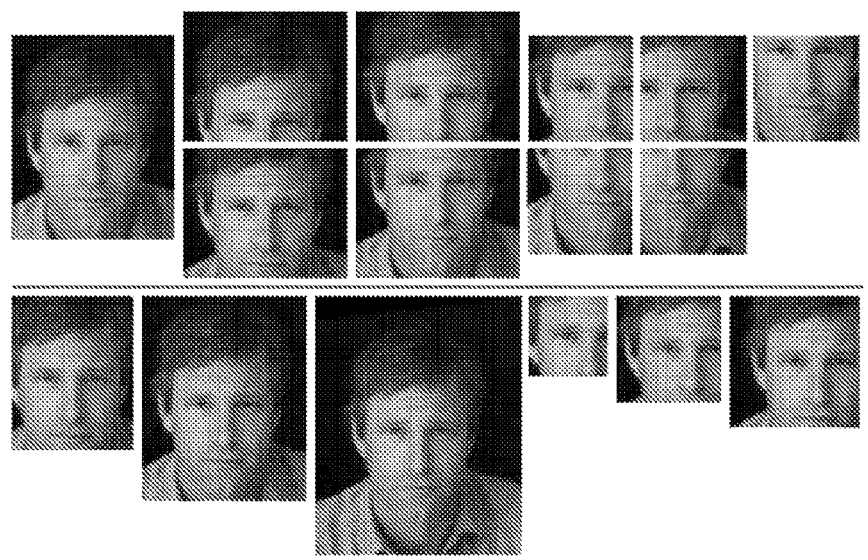
FIG. 3 is a schematic diagram illustrating examples of the cropped regions, consistent with a first disclosed embodiment.

For each of the ConvNets, the feature extracting unit 10 operates to input a particular region and its flipped counterpart to each of ConvNets to extract the HIFs. FIG. 3 illustrates examples of the cropped regions, wherein the top 10 face regions are of the medium scales. The five regions in the top left are global regions taken from the weakly aligned faces, the other five in the top right are local regions centered around the five facial landmarks (two eye centers, nose tip, and two mouse corners). In bottom of FIG. 3, it is shown three scales of two particular patches.

Figure 4:
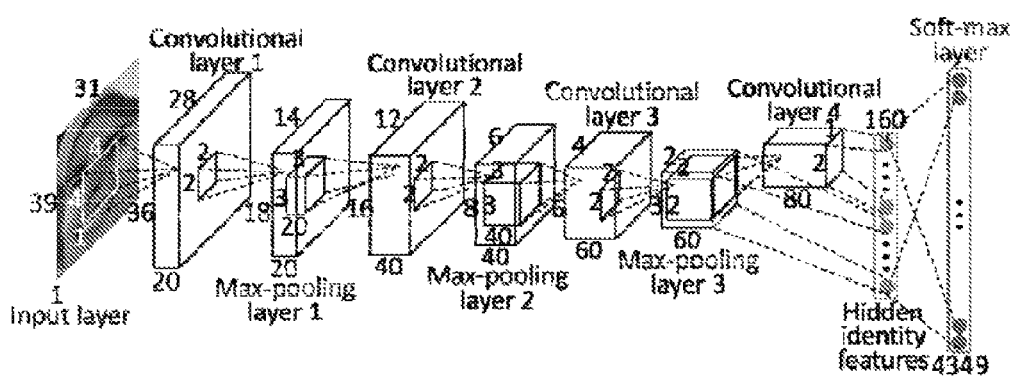
FIG. 4 is a schematic diagram illustrating the detailed structure of the ConvNets, consistent with a second disclosed embodiment.

According to one embodiment of the present application, each of the extracted HIFs may form a feature vector. The formed vector may have, for example, 160 dimensions as shown in FIG. 4. The verification unit 20 may concatenate all the extracted HIFs of each face to form a longer dimensional feature vector. For example, in the embodiment as shown in FIG. 4, the concatenated vector may be of 19,200 dimensions.

In embodiments of the present application, each of the ConvNets may comprise a plurality of cascaded feature extracting layers and a last hidden layer connected to at least one of the feature extracting layers, wherein the number of features in the current layer of ConvNets, where the features are extracted from the previous layer features of the ConvNets, continue to reduce along the cascaded feature extracting layers until said HIFs are obtained in the last hidden layer of the ConvNets. FIG. 4 further shows the detailed structure of the ConvNets with 39×3.1×k input. As shown in FIG. 4, the ConvNets may contain four convolutional layers (with max-pooling) to extract features hierarchically, followed by the (fully-connected) HIF layer and the (fully connected) softmax output layer indicating identity classes. The input to each of the ConvNets is 39×31×k for rectangle patches, and 39×31×k for square patches, where k=3 for color patches and k=1 for gray patches. When the input sizes change, the height and width of maps in the following layers will change accordingly. Feature numbers continue to reduce along the feature extraction hierarchy until the last hidden layer (the HIF layer), where highly compact and predictive features are formed, which predict a much larger number of identity classes with only a few features. In FIG. 4, the length, width, and height of each cuboid denote the map number and the dimension of each map for all input, convolutional, and max-pooling layers. The inside small cuboids and squares denote the 3D convolution kernel sizes and the 2D pooling region sizes of convolutional and max-pooling layers, respectively. Neuron numbers of the last two fully-connected layers are marked beside each layer.

Figure 5:
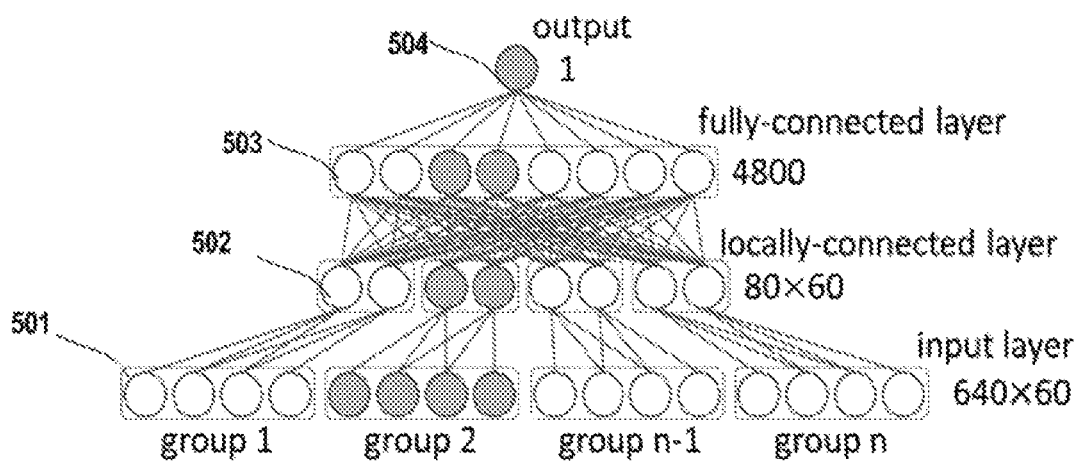
FIG. 5 is a schematic diagram illustrating a structure of the neural network used for face verification. The layer type and dimension are labeled beside each layer. The solid neurons form a sub-network.

In practice, any face verification models could be used based on the extracted HIFs. Joint Bayesian and the neural network model are two examples. The verification unit 20 may be formed as a neural network shown in FIG. 5, which contains one input layer 501 taking the HIFs, one locally-connected layer 502, one fully-connected layer 503, and a single output neuron 504 indicating face similarities. The input features are divided into 60 (for example) groups, each of which contains 640 (for example) features extracted from a particular patch pair with a particular ConvNet. Features in the same group are highly correlated. One group of Neuron units (for example, two neurons as shown) in the locally-connected layer only connects to a single group of features to learn their local relations and reduce the feature dimension at the same time. The second hidden layer is fully-connected to the first hidden layer to learn global relations. The single output neuron is fully connected to the second hidden layer. The hidden neurons are ReLUs (for example) and the output neuron is sigmoid (for example). An illustration of the neural network structure is shown in FIG. 5. For example, it may have 38,400 input neurons with 19,200 HIFs from each patch, and 4,800 neurons in the following two hidden layers, with every 80 neurons in the first hidden layer locally connected to one of the 60 groups of input neurons.

Dropout learning as well known in the art may be used for all the hidden neurons. The input neurons cannot be dropped because the learned features are compact and distributed representations (representing a large number of identities with very few neurons) and have to collaborate with each other to represent the identities well. On the other hand, learning high-dimensional features without dropout is difficult due to gradient diffusion. To solve this problem, the present application first trains a plurality of (for example, 60) sub-networks, each of which takes features of a single group as input. A particular sub-network is illustrated in FIG. 5, the present application then uses the first-layer weights of the sub-networks to initialize those of the original network, and tunes the second and third layers of the original network with the first layer weights clipped.

Figure 8:
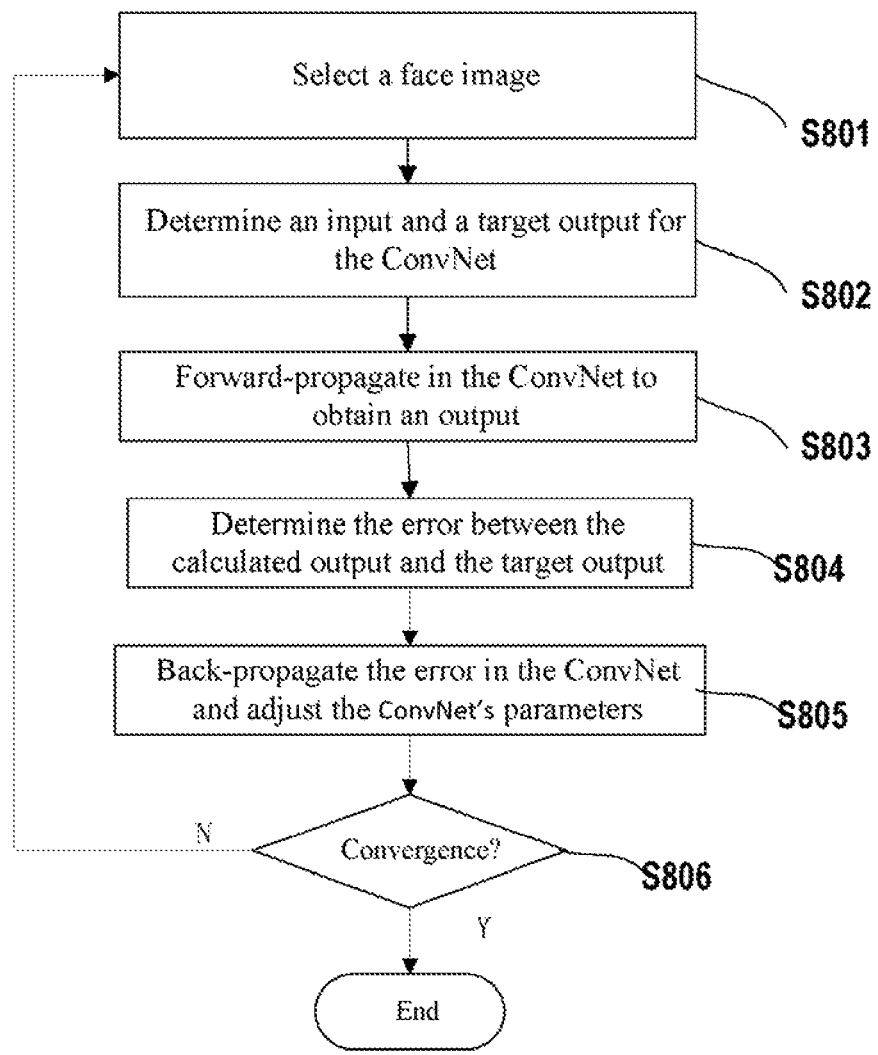
FIG. 8 is a schematic flowchart illustrating training process of ConvNets consistent with some disclosed embodiments.

The apparatus 1000 further comprises a training unit 30 configured to train a plurality of ConvNets for identity classification by inputting aligned regions of faces, as discussed in the above reference to FIG. 3. For each of ConvNets, FIG. 8 illustrates a schematic flowchart for training process consistent with some disclosed embodiments. As shown, in step S801, a face image is selected from a predetermined face training set. In one embodiment, the face image may be selected randomly. In step S802, an input to the ConvNet will be determined. In particular, the input may be a face patch cropped from the face selected in S801. A target output for the ConvNet corresponding to the input will be also previously determined, which is a vector of all zeros except the n-th element of the vector being 1, where n represents the identity index of the identity class to which the selected face belongs.

And then in step S803, the face patch determined above is inputted to the ConvNet to calculate its output by a process of forward propagation, which may includes convolution operations and Max-pooling operations as discussed below in reference to formulas 1 and 2.

In step S804, the calculated output is compared with the target output to generate an error signal between the calculated output and the target output. The generated error signal is then back-propagated through the ConvNet so as to adjust parameters of the ConvNet in step S805. In step S806, it is determined if the training process is converged, if yes, the process is terminated; otherwise it will repeat step S801-S805 until the training process is converged such that the parameters of the ConvNet are determined.

Hereinafter, the convolution operations and the Max-pooling operations as mentioned in the above will be further discussed.

The convolution operation of each convolutional layer of the ConvNets as shown in FIG. 4 may be expressed as $$y^{j(r)} = \max\left(0, b^{j(r)} + \sum_i k^{ij(r)} * x^{i(r)}\right) \quad (1)$$

where $x^i$ and $y^j$ are the i-th input map and the j-th output map, respectively. $k^{ij}$ is the convolution kernel between the i-th input map and the j-th output map. * denotes convolution. $b^j$ is the bias of the j-th output map. Herein, ReLU nonlinearity y=max(0, x) is used for hidden neurons, which is shown to have better fitting abilities than the sigmoid function. Weights in higher convolutional layers of the ConvNets are locally shared to learn different mid- or high-level features in different regions. r indicates a local region where weights are shared. Max-pooling as shown in FIG. 4 may be formulated as $$y_{j,k}^i = \max_{0 \le m,n < s}\{x_{j\cdot s+m,k\cdot s+n}^i\} \quad (2)$$

where each neuron in the i-th output map $y^i$ pools over an s×s non-overlapping local region in the i-th input map $x^i$.

The last hidden layer of HIFs may be fully-connected to at least one of convolutional layers (after max-pooling). In one preferable embodiment, the last hidden layer of HIFs is fully-connected to both the third and fourth convolutional layers (after max-pooling) such that it sees multi-scale features (features in the fourth convolutional layer are more global than those in the third one). This is critical to feature learning because after successive down-sampling along the cascade, the fourth convolutional layer contains too few neurons and becomes the bottleneck for information propagation. Adding the bypassing connections between the third convolutional layer (referred to as the skipping layer) and the last hidden layer reduces the possible information loss in the fourth convolutional layer. The last hidden layer may take the function $$y_j = \max\left(0, \sum_i x_i^1 \cdot w_{i,j}^1 + \sum_i x_i^2 \cdot w_{i,j}^2 + b_j\right) \quad (3)$$

where $x^1$, $w^1$, $x^2$, $w^2$ denote neurons and weights in the third and fourth convolutional layers, respectively. It linearly combines features in the previous two convolutional layers, followed by ReLU non-linearity.

The ConvNet output $y_i$ is a multiple-way (4349-way, for example) soft-max predicting the probability distribution over a plurality of (4349, for example) different identities. Taking the formed vector is of 160-dimensional and there are 4349 different identities as an example, the output $y_i$ may be formulized as:

$$y_i = \frac{\exp(y_i')}{\sum_{j=1}^{4349} \exp(y_j')} \quad (4)$$

where $$y_j' = \sum_{i=1}^{160} x_i \cdot w_{i,j} + b_j$$

linearly combines the 160 HIFs $x_i$, as the input of neuron j, and $y_j$ is its output. The ConvNet is learned by minimizing $-\log y_t$, with the t-th target class. Stochastic gradient descent may be used with gradients calculated by back-propagation.

Figure 6:
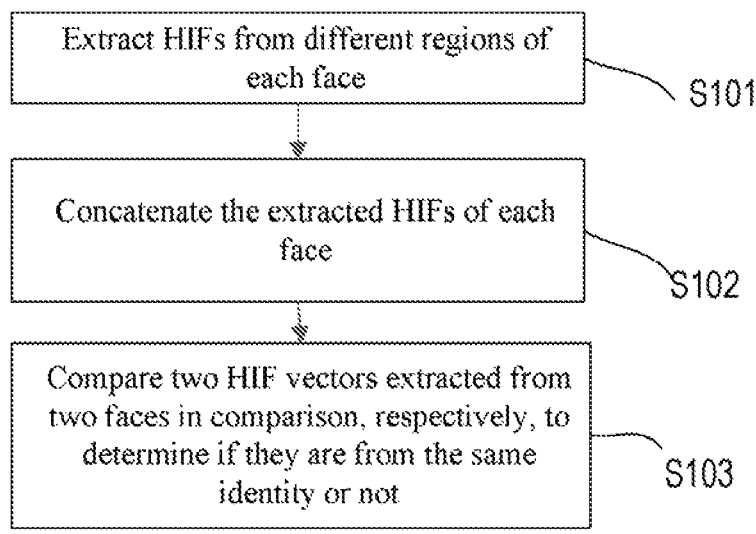
FIG. 6 is a schematic flowchart illustrating face verification consistent with some disclosed embodiments.
Figure 7:
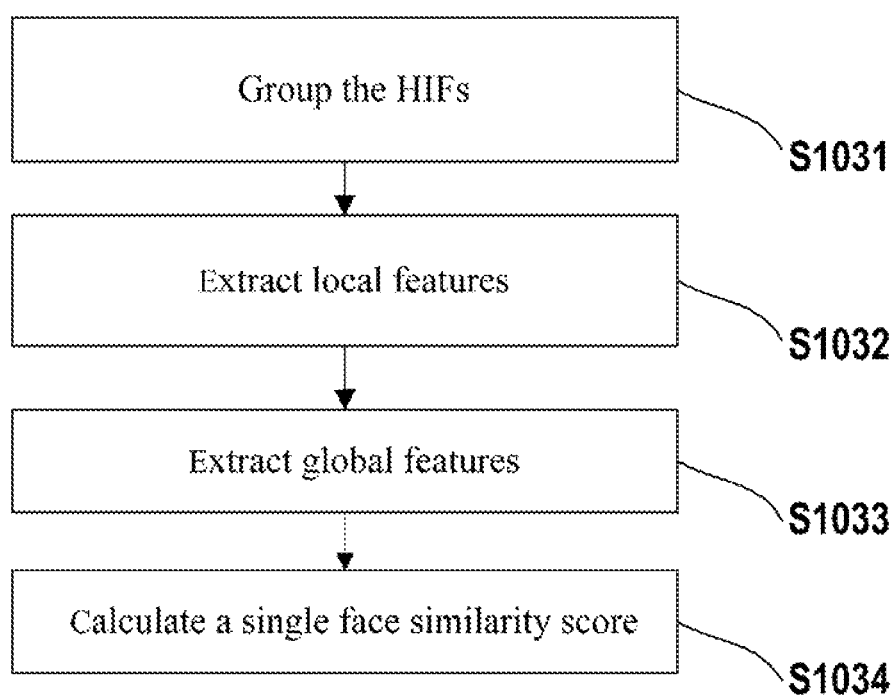
FIG. 7 is a schematic flowchart illustrating the step of S103 as shown in FIG. 6.

FIG. 6 shows a flowchart illustrating a method for face verification consistent with some disclosed embodiments. In FIG. 6, process 200 comprises a series of steps that may be performed by one or more of processors 102-106 or each module/unit of the apparatus 1000 to implement a data processing operation. For purpose of description, the following discussion is made in reference to the situation where each module/unit of the apparatus 1000 is made in hardware or the combination of hardware and software. The skilled in the art shall appreciate that other suitable devices or systems shall be applicable to carry out the following process and the apparatus 1000 are just used to be an illustration to carry out the process.

At step S101, the apparatus 1000 operates to extracts HIFs from different regions of faces by using different trained ConvNets, wherein last hidden layer neuron activations of said ConvNets are considered as the HIFs. In one embodiment, the unit 10 of the apparatus 1000 may, for example, detects five facial landmarks, including the two eye centers, the nose tip, and the two mouth corners, with the facial point detection method proposed by the prior art. Faces are globally aligned by similarity transformation according to the two eye centers and the mid-point of the two mouth corners. Features are extracted from 60 (for example) face patches with 10 (for example) regions, three scales, and RGB or gray channels FIG. 3 shows the 10 face regions and the 3 scales of two particular face regions. The unit 20 trained 60 ConvNets, each of which extracts two 160-dimensional HIF vectors from a particular patch and its horizontally flipped counterpart. A special case is patches around the two eye centers and the two mouth corners, which are not flipped themselves, but the patches symmetric with them (for example, the flipped counterpart of the patch centered on the left eye is derived by flipping the patch centered on the right eye).

And then in step s102, the apparatus 1000 operates to concatenate, for each of the second plurality of faces, the extracted HIFs to form a feature vector. In the example in which the training unit 30 trained a plurality of (60, for example) ConvNets, the feature extracting unit 30 may extract HIFs for different regions of faces by using these differently trained ConvNets, and then concatenate, for each of faces, the extracted HIFs to form a feature vector, the total length of which may be, for example, 19,200 (160×2×60) in case there are 60 ConvNets, each of which extracting 16×2 dimensions of HIFs, The concatenated HIFs are ready for the final face verification.

And then in step S103, the apparatus 1000 operates to compare two of the formed vectors extracted from the two faces, respectively, to determine if the two vectors are from the same identity or not. In some of the embodiments of the present application, the Joint Bayesian technique for face verification based on the HIFs may be used. Joint Bayesian has been highly successful for face verification. It represents the extracted facial features x (after subtracting the mean) by the sum of two independent Gaussian variables $$x = \mu + \epsilon \quad (5)$$

where $\mu \sim N(0, S_\mu)$ represents the face identity and $\epsilon \sim N(0, S_\epsilon)$ represents the intra-personal variations. Joint Bayesian models the joint probability of two faces given the intra or extra-personal variation hypothesis, $P(x_1, x_2 | H_I)$ and $P(x_1, x_2 | H_E)$. It is readily shown from Equation (5) that these two probabilities are also Gaussian with variations $$\sum_I = \begin{bmatrix} S_\mu + S_\epsilon & S_\mu \\ S_\mu & S_\mu + S_\epsilon \end{bmatrix} \quad (6)$$

and $$\sum_E = \begin{bmatrix} S_\mu + S_\epsilon & 0 \\ 0 & S_\mu + S_\epsilon \end{bmatrix}, \quad (7)$$

respectively. $S_\mu$, and $S_\epsilon$ can be learned from data with EM algorithm. In test, it calculates the likelihood ratio $$r(x_1, x_2) = \log \frac{P(x_1, x_2 | H_I)}{P(x_1, x_2 | H_E)}, \quad (8)$$

which has closed-form solutions and is efficient.

FIG. 6 illustrates a flowchart to show how the neural network model as shown in FIG. 5 works in the step S103. In step S1031, the input layer 501 operates to group the HIFs of the feature vectors formed in step S102 into n groups. Each group contains HIFs extracted by the same ConvNets. In S1032, the locally-connected layer 502 operates to extract local features from each group of HIFs. In S1033, the fully-connected layer 503 operates to extract global features from the previously extracted local features. In S1034, the output neuron 504 operates to calculate a single face similarity score based on the previously extracted global features.

Although the preferred examples of the present invention have been described, those skilled in the art can make variations or modifications to these examples upon knowing the basic inventive concept. The appended claims is intended to be considered as comprising the preferred examples and all the variations or modifications fell into the scope of the present invention.

Obviously, those skilled in the art can make variations or modifications to the present invention without departing the spirit and scope of the present invention. As such, if these variations or modifications belong to the scope of the claims and equivalent technique, they may also fall into the scope of the present invention.

What is claimed is:

1. An apparatus for face verification, comprising:
    a memory storing one or more software applications;
    a processor that executes the one or more software applications to:
        extract HIFs (Hidden Identity Features) for different regions of faces by using differently trained ConvNets, wherein last hidden layer neuron activations of said ConvNets are considered as the HIFs;
        concatenate the extracted HIFs of each of the faces to form a feature vector;
        group the HIFs into a plurality of groups in the formed feature vector for each face, each group containing HIFs extracted by same ConvNets;
        extract local features from each group of HIFs;
        extract global features from the previous extracted local features; and
        calculate a single face similarity score from the extracted global features so as to determine if the two feature vectors are from the same identity or not based on the calculated score.

2. An apparatus of claim 1 wherein, when executing the one or more software applications, the processor is configured to train the ConvNets for identity classification by inputting aligned regions of faces.

3. An apparatus of claim 1, wherein, for each of the ConvNets, when executing the one or more software applications, the processor is configured to input a particular region and its flipped counterpart to each of ConvNets so as to extract the HIFs.

4. An apparatus of claim 3, wherein, when executing the one or more software applications, the processor is configured to concatenate all the extracted HIFs of each face to form the feature vector for face verification.

5. An apparatus of claim 2, wherein each of the ConvNets comprises a plurality of cascaded feature extracting layers and a last hidden layer connected to at least one of the feature extracting layers;
    wherein the number of features in the current layer of ConvNets, where the features are extracted from the previous layer features of the ConvNets, continue to reduce along the cascaded feature extracting layers until said HIFs are obtained in the last hidden layer of the ConvNets.

6. An apparatus of claim 5, wherein each of the ConvNets comprises four cascaded feature extracting layers and a last hidden layer connected to third and a fourth feature extracting layers.

7. An apparatus of claim 2, wherein for each of the ConvNets, when executing the one or more software applications, the processor is further configured to:
   1) select a face image from a predetermined face training set;
   2) determine an input and a target output for the ConvNet, respectively, wherein the input is a face patch cropped from the selected face and the target output is a vector of all zeros except the n-th position being 1, where n is an identity index of the selected face;
   3) input the face patch to the ConvNet to calculate an output by a process of forward propagation in the ConvNet;
   4) compare the calculated output with the target output to generate an error signal;
   5) back-propagate the generated error signal through the ConvNet so as to adjust parameters of the ConvNet; and
   6) repeat steps 1)-5) until the training process is converged such that the parameters of the ConvNet are determined.

8. A method for face verification, comprising:
   extracting HIFs from different regions of each face by using differently trained ConvNets, wherein last hidden layer neuron activations of said ConvMets are considered as the HIF s;
   concatenating the extracted HIFs of each face to form a feature vector;
   grouping the HIFs in the formed feature vector for each face into a plurality of groups, each of which contains HIFs extracted by same ConvNets;
   extracting local features from each group of HIFs;
   extracting global features from the previously extracted local features; and
   calculating a single face similarity score from the extracted global features so as to determine if the two feature vectors are from the same identity or not based on the score.

9. A method of claim 8, further comprising:
   training a plurality of ConvNets for identity classification by inputting aligned regions of faces.

10. A method of claim 9, wherein, for each of the ConvNets, wherein the training further comprises:
    1) selecting a face image from a predetermined face training set;
    2) determining an input and a target output for the ConvNet, respectively, wherein the input is a face patch cropped from the selected face and the target output is a vector of all zeros except the n-th position being 1, where n is an identity index of the selected face;
    3) inputting the face patch to the ConvNet to calculate its output by a process of forward propagation in the ConvNet;
    4) comparing the calculated output with the target output to generate an error signal;
    5) back-propagating the generated error signal through the ConvNet so as to adjust parameters of the ConvNet; and
    6) repeating steps 1)-5) until the training process is converged such that the parameters of the ConvNet are determined.

11. A method of claim 8, wherein for each of the ConvNets, the extracting comprises:
    inputting a particular region and its flipped counterpart to each of the ConvNets to extract the HIFs.

12. A method of claim 8, wherein the concatenating comprises:
    concatenating all the extracted HIFs of each face to form a feature vector.

13. A method of claim 9, wherein each of the ConvNets comprises a plurality of cascaded feature extracting layers and a last hidden layer connected to at least one of the feature extracting layers;
    wherein the number of features in the current layer of ConvNets, where the features are extracted from the previous layer features of the ConvNets, continue to reduce along the cascaded feature extracting layers until said HIFs are obtained in the last hidden layer of the ConvNets.

* * * * *